(12) United States Patent
Hirabayashi et al.

(10) Patent No.: US 7,363,713 B2
(45) Date of Patent: Apr. 29, 2008

(54) RECIPROCATING POWER TOOL

(75) Inventors: Shinji Hirabayashi, Anjo (JP); Kenji Kobayashi, Anjo (JP)

(73) Assignee: Makita Corporation, Anjo-shi (JP)

( * ) Notice: Subject to any disclaimer, the term of this patent is extended or adjusted under 35 U.S.C. 154(b) by 280 days.

(21) Appl. No.: 10/874,602

(22) Filed: Jun. 23, 2004

(65) Prior Publication Data
US 2004/0255475 A1 Dec. 23, 2004

(30) Foreign Application Priority Data

Jun. 23, 2003 (JP) ............................. 2003-178566
Jul. 10, 2003 (JP) ............................. 2003-194900

(51) Int. Cl.
*B27B 11/00* (2006.01)
*B23D 49/16* (2006.01)

(52) U.S. Cl. ............................................ 30/392; 74/49
(58) Field of Classification Search ................. 30/392, 30/393, 394; 74/49
See application file for complete search history.

(56) References Cited

U.S. PATENT DOCUMENTS

| | | | | | |
|---|---|---|---|---|---|
| 2,501,631 | A | * | 3/1950 | Oschwald | 74/50 |
| 2,917,088 | A | * | 12/1959 | Papworth | 30/374 |
| 2,931,402 | A | * | 4/1960 | Papworth | 30/393 |
| 2,949,944 | A | * | 8/1960 | Blachly | 30/394 |
| 3,945,120 | A | * | 3/1976 | Ritz | 30/393 |
| 4,238,884 | A | * | 12/1980 | Walton, II | 30/393 |
| 4,240,204 | A | * | 12/1980 | Walton et al. | 30/393 |
| 4,272,996 | A | * | 6/1981 | Sauerwein | 74/50 |
| 5,025,562 | A | | 6/1991 | Palm | |
| 5,050,307 | A | | 9/1991 | Palm | |
| 5,099,705 | A | * | 3/1992 | Dravnieks | 74/50 |
| 5,205,043 | A | * | 4/1993 | Batt et al. | 30/393 |
| 6,230,411 | B1 | * | 5/2001 | Wall et al. | 30/376 |
| 6,370,781 | B1 | * | 4/2002 | Sasaki | 30/392 |
| 2004/0117993 | A1 | * | 6/2004 | Armstrong | 30/392 |

(Continued)

FOREIGN PATENT DOCUMENTS

DE    41 06 415 A1    10/1991

(Continued)

*Primary Examiner*—Hwei-Siu C. Payer
(74) *Attorney, Agent, or Firm*—Lahive & Cockfield, LLP; Anthony A. Laurentano

(57) ABSTRACT

It is an object of the present invention to provide a useful technique for effectively reducing vibration in a reciprocating power tool with a simple structure. According to the present invention, a representative reciprocating power tool includes a motor, a tool bit, a slider, a motion converting mechanism and a counter weight. The tool bit performs a predetermined operation by reciprocating. The slider reciprocates to drive the tool bit. The motion converting mechanism converts a rotating output of the motor into a reciprocating movement of the slider. The counter weight is provided in the motion converting mechanism. Further, the counter weight reciprocates in a direction opposite to the reciprocating direction of the slider. The phase difference between the reciprocating movement of the slider and the reciprocating movement of the counter weight is set such that a time lag is provided between the instant when the slider reaches a top dead center and the instant when the counter weight reaches a bottom dead center. With such construction, timing for reducing the kinetic energy caused by the reciprocating movement of the slider can be optimized, taking into account a cutting resistance that the tool bit receives from the workpiece during operation.

23 Claims, 12 Drawing Sheets

U.S. PATENT DOCUMENTS

2004/0255475 A1* 12/2004 Hirabayashi et al. .......... 30/392
2004/0261274 A1* 12/2004 Tam et al. .................... 30/392
2005/0022395 A1*  2/2005 Hirabayashi ................. 30/392
2006/0117581 A1*  6/2006 Oki et al. .................... 30/392

FOREIGN PATENT DOCUMENTS

EP        0 561 473 A1 *  9/1993
JP        2001-009632       1/2001

* cited by examiner

US 7,363,713 B2

RECIPROCATING POWER TOOL

BACKGROUND OF THE INVENTION

1. Field of the Invention

The present invention relates to a reciprocating power tool, such as a reciprocating saw, and more particularly, to a practical technique of reducing vibration in a reciprocating power tool with a simple structure, taking into account the behavior of the tool bit in actual operation of cutting a workpiece.

2. Description of the Related Art

Japanese non-examined laid-open Patent Publication No. 2001-9632 (D1) discloses a reciprocating saw. The known saw includes a motion converting mechanism for causing a slider to reciprocate via the rotational movement of the motor. A tool bit is mounted on the end of the slider. Further, a counter weight is provided in the motion converting mechanism. When the slider reciprocates, the counter weight reciprocates in a direction opposite to the reciprocating direction of the slider. As a result, vibration caused by reciprocating movement of the slider can be reduced.

By using such a counter weight that reciprocates with a 180° phase shift with respect to the reciprocating movement of the slider, the momentum mainly including the inertial force can be reduced between the slider and the counter weight in the axial direction of the slider. However, optimum timing for vibration reduction by the counter weight differs, according to the presence or absence of external resistance that acts on the tool bit, between the state in which the cutting operation is actually performed on the workpiece by the tool bit and the state in which the power tool is idled without performing a cutting operation. Further, even in the operation of cutting a workpiece, the external resistance that acts on the tool bit varies in a certain range according to various factors.

SUMMARY OF THE INVENTION

It is an object of the present invention to provide a useful technique for effectively reducing vibration in a reciprocating power tool with a simple structure.

According to the present invention, a representative reciprocating power tool includes a motor, a tool bit, a slider, a motion converting mechanism and a counter weight. The tool bit performs a predetermined operation by reciprocating. The slider reciprocates to drive the tool bit. The motion converting mechanism converts a rotating output of the motor into a reciprocating movement of the slider. The counter weight is provided in the motion converting mechanism. Further, the counter weight reciprocates in a direction opposite to the reciprocating direction of the slider. The phase difference between the reciprocating movement of the slider and the reciprocating movement of the counter weight is set such that a time lag is provided between the instant when the slider reaches a top dead center and the instant when the counter weight reaches a bottom dead center.

With such construction, timing for reducing the kinetic energy caused by the reciprocating movement of the slider can be optimized, taking into account a cutting resistance that the tool bit receives from the workpiece during operation.

Other objects, features and advantages of the present invention will be readily understood after reading the following detailed description together with the accompanying drawings and the claims.

DETAILED DESCRIPTION OF THE INVENTION

Figure 1:
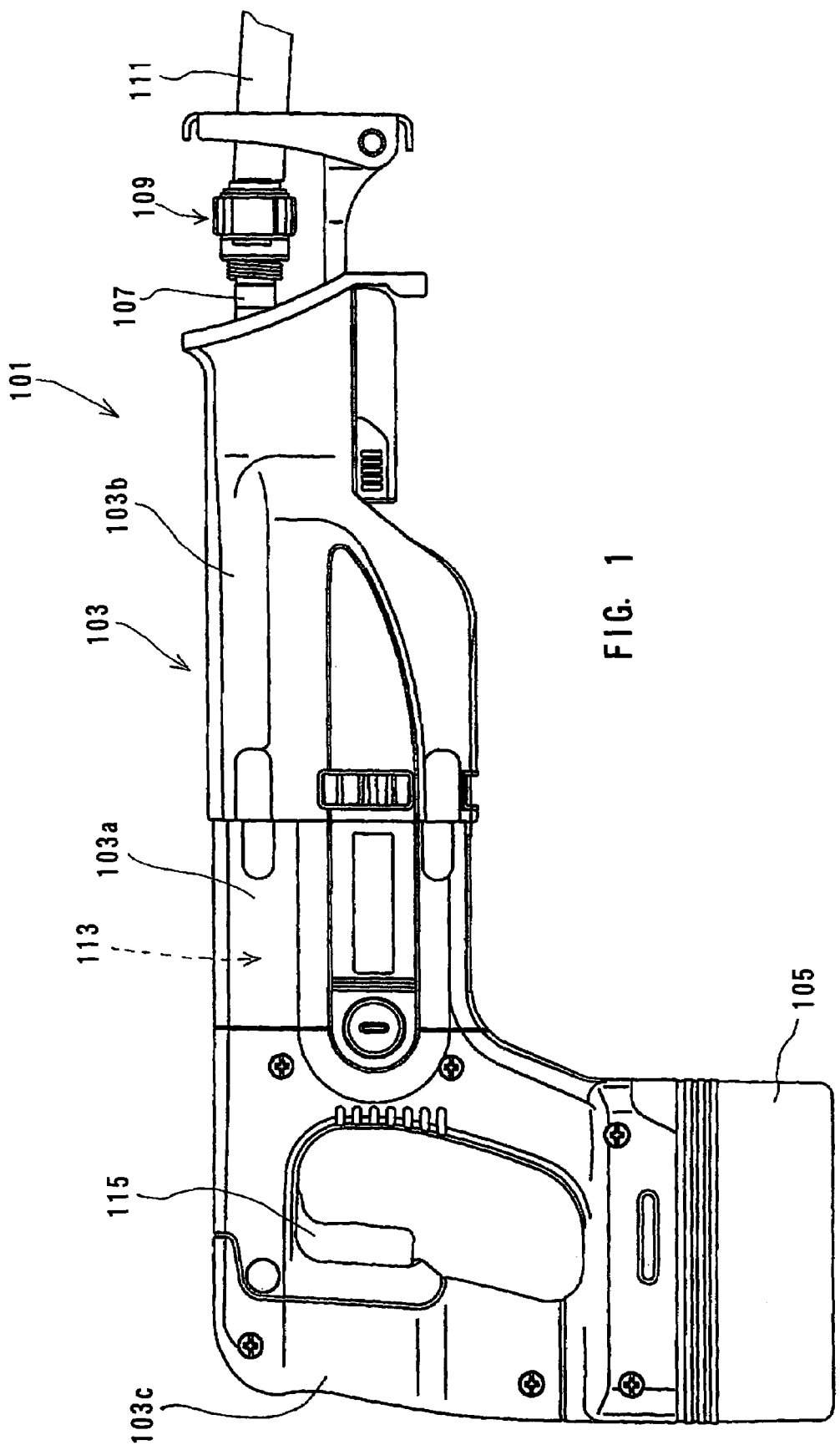
FIG. 1 is a view showing an entire reciprocating saw according to an embodiment of the invention.

As one aspect of the present invention, the phase difference between the reciprocating movement of the slider and the reciprocating movement of the counter weight may be fixedly set such that a time lag is provided between the instant when the slider reaches a top dead center and the instant when the counter weight reaches a bottom dead center. For example, a cutting resistance which may most frequently appear in an actual operation of the power tool is detected and then, the phase difference can be fixedly set to an angle at which the effect of vibration reduction can be maximized to accommodate with the practical operation. As a result, vibration reduction can be effectively achieved with a simple structure, taking into account the behavior and/or properties of the tool bit in actual operation of cutting a workpiece by reciprocating the tool bit.

The phase difference between the reciprocating movement of the slider and the reciprocating movement of the counter weight may be fixedly set such that the phase of the reciprocating movement of the counter weight is delayed over 180° with respect to the phase of the reciprocating movement of the slider. This is because, for example, when a workpiece is cut by a tool bit, the phase of the reciprocating movement of the slider tends to shift to a delayed side, compared with the state of idle running in which the cutting operation is not performed, or under unloaded driving conditions in which the tool bit does not receive a resistance from the workpiece.

Preferably, the phase difference between the reciprocating movement of the slider and the reciprocating movement of the counter weight can be switched from a state in which it is fixedly set to a predetermined phase difference to a state in which it is fixedly set to a different phase difference. For example, when the tool bit is replaced to another one of the different kind, various changes may be made to the operation conditions, or it may be necessary to readjust the timing for the counter weight to reduce vibration caused by the reciprocating movement of the slider. In this invention, such change or adjustment can be easily addressed by changing from a state in which it is fixedly set to a predetermined phase difference to a state in which it is fixedly set to a different phase difference.

Further, as another aspect of the present invention, the power tool may be switched at least between a first vibration reducing mode in which the slider and the counter weight reciprocate to each other with a predetermined phase difference and a second vibration reducing mode in which the slider and the counter weight reciprocate to each other with a different phase difference from that in the first vibration reducing mode. By providing multiple vibration reducing modes, the counter weight can reduce the momentum or kinetic energy of the slider in the optimum timing.

Each of the additional features and method steps disclosed above and below may be utilized separately or in conjunction with other features and method steps to provide improved reciprocating power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Representative Embodiment

First representative embodiment of the present invention will now be described with reference to the drawings. As shown in FIG. 1, a reciprocating saw 101 as a representative embodiment of the power tool according to the present invention includes a body 103, a battery pack 105 that is removably attached to the body 103, a slider 107 that projects from the body 103 to the side of the front end of the reciprocating saw 101 (rightward as viewed in FIG. 1) and a blade 111 that is mounted to a chuck 109 on the end of the slider 107 and cuts a workpiece (not shown). The blade 111 is a feature that corresponds to the "tool bit" according to the present invention. A motor housing 103a, a gear housing 103b and a handgrip 103c form the body 103 in one piece.

Figure 2:
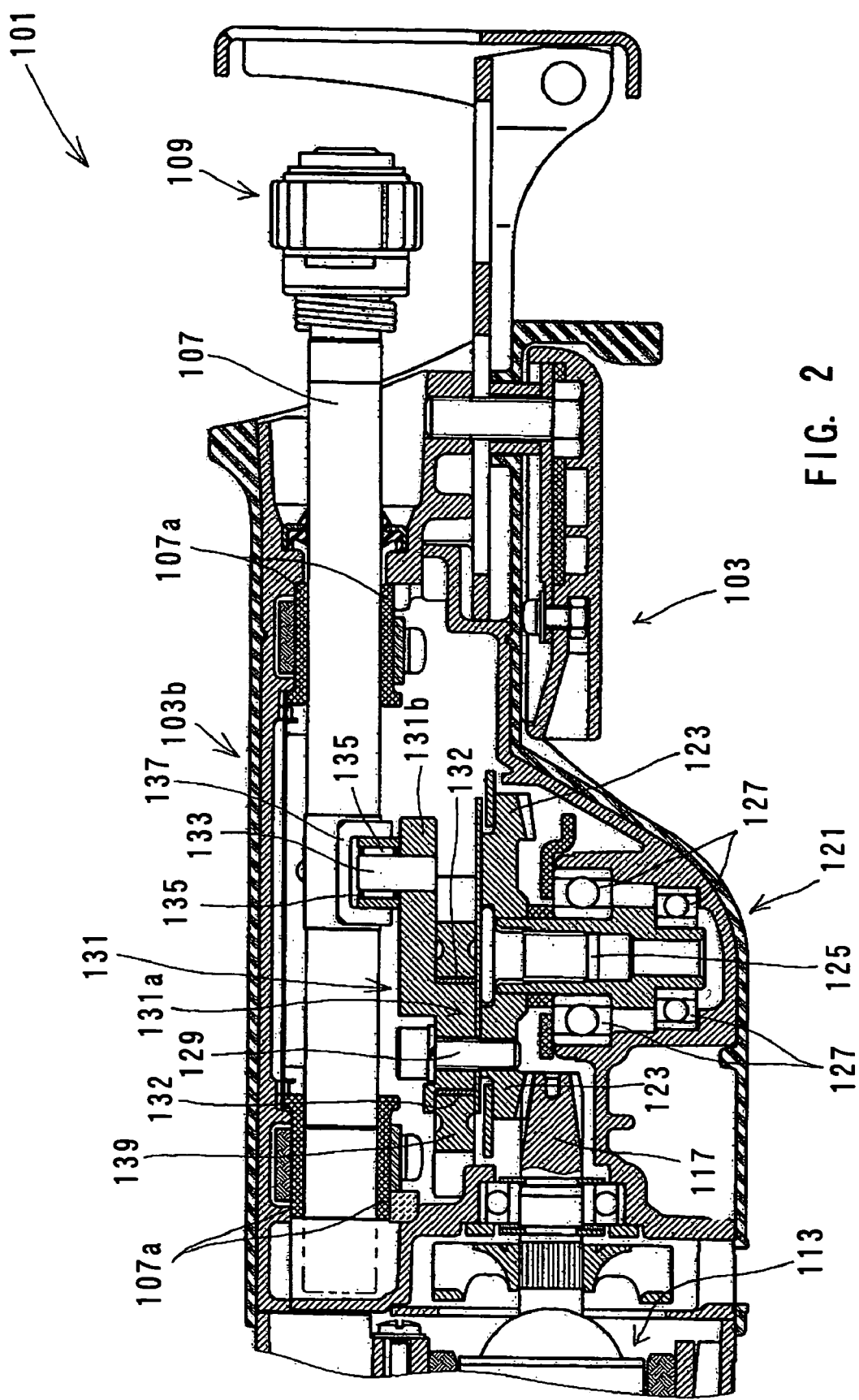
FIG. 2 is a partial, sectional view of an essential part of the representative reciprocating saw.

The motor housing 103a of the body 103 houses a motor 113 (see FIG. 2). The motor 113 is driven when the user depresses a trigger switch 115. The blade 111 then reciprocates together with the slider 107 and the chuck 109 and can cut a workpiece.

FIG. 2 shows an essential part of the reciprocating saw 101 according to the present invention. In FIG. 2, the handgrip 103c and the blade 111 are not shown. As shown in FIG. 2, bearings 107a support the slider 107 such that the slider 107 can reciprocate in its axial direction. The slider 107 is connected to a motor output shaft 117 via a motion converting mechanism 121 disposed within the gear housing 103b of the body 103.

The motion converting mechanism 121 is adapted to convert the rotational motion of the motor output shaft 117 into the reciprocating motion in the axial direction of the slider 107. The motion converting mechanism 121 includes a bevel gear 123, an eccentric pin 129, a crank 131, a guide pin 133 and a counter weight 139. The crank 131 is adapted to cause the slider 107 and the counter weight 139 to reciprocate via the rotating output of the motor 113. A phase difference of 180° is provided between the reciprocating motion of the slider 107 and the reciprocating motion of the counter weight 139, and the counter weight 139 reciprocates with a phase delay, which will be described below.

The bevel gear 123 is rotatably supported by bearings 127 and mounted on the upper end of a rotating shaft 125 such that the bevel gear 123 can rotate together with the rotating shaft 125. The bevel gear 123 engages with the motor output shaft 117. One end of the eccentric pin 129 is threadingly inserted into the bevel gear 123 at a position shifted a predetermined distance from the center of rotation of the bevel gear 123. The eccentric pin 129 has a large-diameter head and a washer on the other end. A base 131a of the crank 131 is disposed between the large-diameter head and washer and the bevel gear 123 and thus integrated with the eccentric pin 129. When the bevel gear 123 rotates around the rotating shaft 125, the crank 131 revolves around the rotating shaft 125 together with the eccentric pin 129. As a result, a guide pin 133 that is mounted to the end portion of the crank 131 is allowed to move between the right position above the rotating shaft 125 as shown in FIG. 2 and the left position (not shown) above the rotating shaft 125. The lower end of the guide pin 133 is press-fitted into the end portion of a slider driving part 131b of the crank 131. The upper end of the guide pin 133 is fitted in a slider block 137 of the slider 107 via a bearing 135. The guide pin 133 can rotate with respect to the slider 107.

Figure 4:
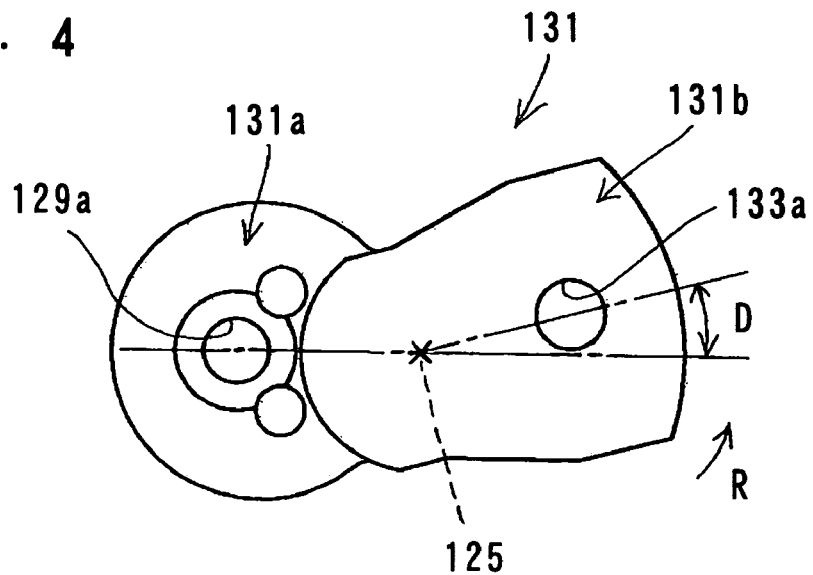
FIG. 4 is a detailed plan view of a crank.
Figure 5:
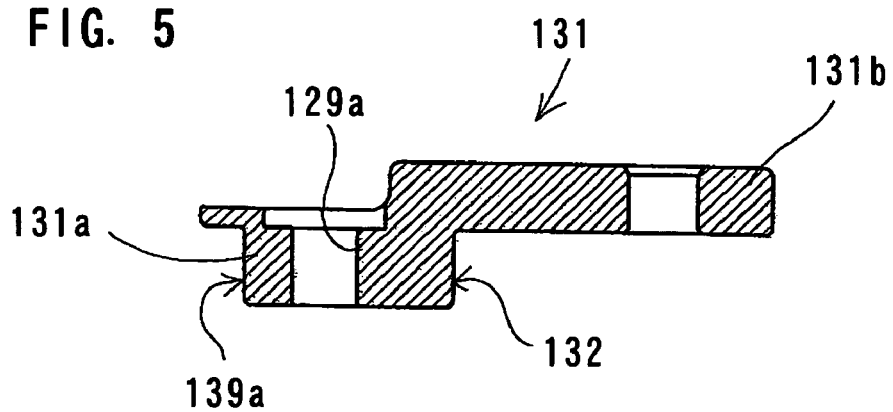
FIG. 5 is a detailed sectional front view of the crank.
Figure 6:
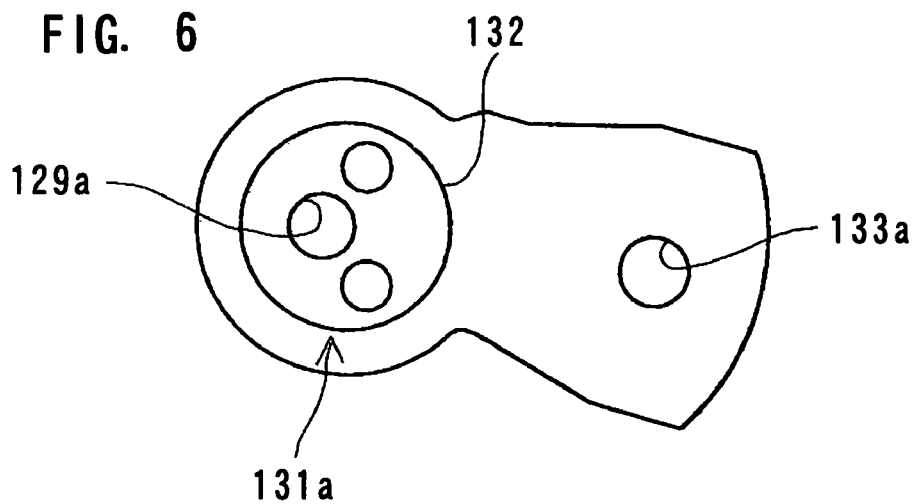
FIG. 6 is a detailed sectional rear view of the crank.

As seen from FIG. 2 and FIGS. 5 and 6 which are the side and bottom views of the crank 131, a counter weight driving part 132 is provided in the base 131a of the crank 131 and the counter weight 139 is loosely fitted around the counter weight driving part 132. The counter weight driving part 132 comprises a cam element formed around a mounting hole 129a (see FIGS. 4 to 6) through which the eccentric pin 129 is inserted. Thus, the counter weight 139 can reciprocate in the axial direction of the slider 107 by the counter weight driving part 132 that is provided in the base 131a of the crank 131. When the bevel gear 123 is rotated around the rotating shaft 125 via the motor output shaft 117, the crank 131 revolves around the rotating shaft 125 together with the eccentric pin 129.

Figure 3:
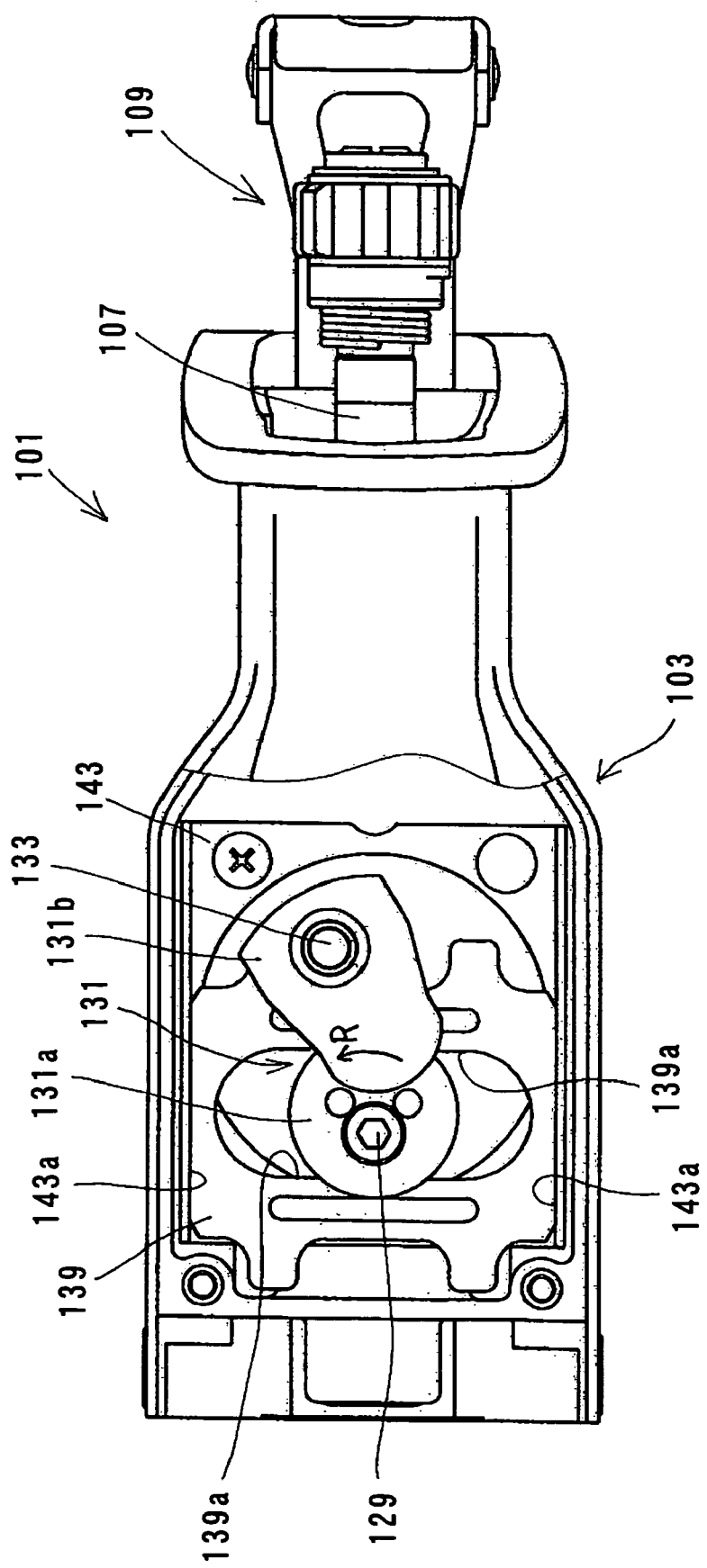
FIG. 3 is a plan view of a motion converting mechanism.

As shown in FIG. 3, which is a plan view of the reciprocating saw 101, an engagement slot 139a is formed in the counter weight 139. Of the revolving motion of the crank 131 around the rotating shaft 125, components of the motion in the direction crossing the longitudinal axis of the slider 107 within a horizontal plane escape into the engagement slot 139*a* and only components of the motion in the axial direction of the slider 107 are transmitted to the counter weight 139. The counter weight 139 is thus allowed to reciprocate only in the axial direction of the slider 107. As shown in FIG. 3, the counter weight 139 is slidably supported by a slide guide 143*a* of a retaining plate 143 that is mounted onto the body 103, so that a reliable reciprocating movement of the counter weight 139 is ensured.

As shown in FIGS. 2 and 3, with regard to the reciprocating movement of the slider 107 and the counter weight 139, the position to which they have moved farthest to the side of the front end of the reciprocating saw 101 (rightward as viewed in the drawings) is defined as the "top dead center", while the position to which they have moved to the side of the rear end of the reciprocating saw 101 (leftward as viewed in the drawings) is defined as the "bottom dead center". Specifically, the slider 107 and the counter weight 139 of this embodiment reciprocate between the top dead center and the bottom dead center.

Further, as shown in FIGS. 3 to 6, the base 131*a* having the counter weight driving part 132 and the slider driving part 131*b* forms the crank 131 in one piece. The slider driving part 131*b* is integrally formed with the base 131*a* and bent an angle D around the rotating shaft 125 with respect to the base 131*a*. Therefore, when the crank 131 is rotated counterclockwise (in the direction shown by arrow R in FIG. 4) around the rotating shaft 125 (see FIG. 2), the phase of rotation of the counter weight driving part 132 is delayed by an angle corresponding to the angle D with respect to the phase of rotation of the slider driving part 131*b*.

Operation of the reciprocating saw 101 constructed as described above will now be explained. When the user depresses the trigger switch 115 of the handgrip 103*c*, the motor 113 is driven by driving current supplied from the battery 105. Thus, the motor output shaft 117 (shown in FIG. 2) is rotated. When the motor output shaft 117 rotates, the bevel gear 123 that engages with the motor output shaft 117 rotates around the rotating shaft 125 in a horizontal plane. Then, the eccentric pin 129 that is eccentrically disposed in a position displaced from the rotating shaft 125 revolves around the rotating shaft 125. As a result, the crank 131 revolves around the rotating shaft 125 in a horizontal plane together with the eccentric pin 129.

As the crank 131 revolves, the guide pin 133 also revolves around the rotating shaft 125 while rotating. The guide pin 133 is loosely fitted in the slider block 137 via the bearing 135. By the revolving movement of the guide pin 133, the slider 107 reciprocates between the top dead center and the bottom dead center. The rotating movement of the guide pin 133 is received by the bearing 135 and not transmitted to the slider 107. Thus, the blade 111 (see FIG. 1) that is coupled to the chuck 109 on the end of the slider 107 reciprocates in the axial direction of the slider 107 and cuts the workpiece.

While the slider 107 reciprocates, the counter weight 139 reciprocates between the top dead center and the bottom dead center via the counter weight driving part 132 that is provided in the base 131*a* of the crank 131, in order to reduce vibration of the reciprocating saw 101 by reducing the kinetic energy (momentum) caused by the reciprocating movement of the slider 107.

In the state of cutting a workpiece with the reciprocating saw 101, that is, under loaded driving conditions for cutting a workpiece, it is necessary to consider not only the effect of the inertial force caused by the slider 107, the chuck 109 and the blade 111 reciprocating together in one piece, but the effect of the cutting resistance caused between the workpiece and the blade 111. This is because the timing for vibration reduction by the counter weight 139 may be shifted due to such cutting resistance received from the workpiece.

Specifically, the inertial force acts in the advancing direction of the slider 107, the chuck 109 and the blade 111, while the cutting resistance acts in the direction opposite to this advancing direction. Further, the inertial force is determined by the acceleration of the slider 107, the chuck 109 and the blade 111, while the cutting resistance is determined by the speed of these elements. There is a phase difference of 90° between the inertial force and the cutting resistance. Thus, the force (cutting resistance) having a different phase is applied, as a function in which the speed is a variable, to the inertial force that is caused by the slider 107, the chuck 109 and the blade 111. Therefore, in order to effectively reduce vibration in the reciprocating saw 101 under loaded driving conditions, not only the inertial force but the cutting resistance to be received from the workpiece must be taken into account.

The cutting resistance is defined by the speed of the above-mentioned elements. However, in actual operation, the speed of these elements varies within a certain range according to parameters such as a force of pressing the blade 111 upon the workpiece. In order to realize vibration reduction of the reciprocating saw 101 which can fully accommodate such fluctuations of the cutting resistance, the structure of the reciprocating saw 101 may be complicated and, particularly as for mass-marketed top-end models, such may not be practical.

Therefore, in this embodiment, it is intended to take a measure to reduce vibration as much as possible without complicating the structure of the reciprocating saw 101. To this end, first, a value of cutting resistance which frequently appears is chosen in advance. Then, according to the cutting resistance, the positional relationship between the base 131*a* and the slider driving part 131*b* of the crank 131 is fixedly set such that a phase delay is caused in the counter weight 139 side with respect to the slider driving part 131*b* side by the predetermined angle D as shown in FIG. 4. Thus, it is configured such that the phase difference between the reciprocating movement of the slider 107 and the reciprocating movement of the counter weight 139 is in the steady state. The predetermined angle D is determined according to the above-mentioned chosen cutting resistance and it is about 15° in this embodiment.

As a result, in this embodiment, compared with the technique in which the base 131*a* and the slider driving part 131*b* are disposed in series, the phase of the reciprocating movement of the counter weight 139 is delayed by the amount corresponding to the angle D from the 180° phase shifted state with respect to the phase of the reciprocating movement of the slider 107. In other words, the base 131*a* is fixed in the relatively delayed state with respect to the slider driving part 131*b* and rotated, so that the counter weight 139 reaches the bottom dead center with a time delay after the slider 107 reaches the top dead center. For example, FIGS. 2 and 3 show the state in which the slider 107 is already beyond the top dead center when the counter weight 139 has reached the bottom dead center.

According to the first representative embodiment, the positional relationship between the base 131*a* and the slider driving part 131*b* is fixedly set, taking into account a certain cutting resistance that the blade 111 receives from the workpiece. As a result, the phase difference between the reciprocating movement of the slider 107 and the reciprocating movement of the counter weight 139 is fixedly set such that a time lag is provided between the instant when one of the members reaches a top dead center and the instant when the other reaches a bottom dead center. Thus, taking into account the cutting resistance which most frequently appears in actual cutting operation, the phase difference can be fixedly set to an angle at which the effect of vibration reduction can be maximized in practical use. Vibration reduction can be realized as effectively as possible without complicating the structure of the reciprocating saw 101.

In this embodiment, the phase of the counter weight 139 is fixed in a state in which it is delayed by a predetermined amount from the 180° phase shifted state with respect to the slider 107. However, it may also be suitably constructed such that the phase of the reciprocating movement of the slider 107 is fixed in a state in which it is delayed by a predetermined amount with respect to the phase of the reciprocating movement of the counter weight 139 in order to provide timing for vibration reduction. Such modification can be appropriately made, for example, according to whether the cutting operation of the blade 111 is performed by pushing or drawing the blade.

Further, although, in this embodiment, the reciprocating saw 101 is described as a representative example of a reciprocating power tool, this invention may be widely applied to any tool, such as a jig saw, which performs an operation on a workpiece while reciprocating.

Further, in this embodiment, the base 131a and the slider driving part 131b form the crank 131 in one piece and are bent with respect to each other. However, the base 131a and the slider driving part 131b may also be separately formed and connected together by fastening means, such as a screw and a bolt, to form the crank 131. In this case, the positional relationship between the base 131a and the slider driving part 131b can be changed by loosening the fastening means. In this manner, a phase difference is set between the reciprocating movement of the slider 107 and the reciprocating movement of the counter weight 139. Then, the fastening means are tightened again. Thus, the timing for vibration reduction by the counter weight 139 can be changed.

Second Representative Embodiment

Figure 7:
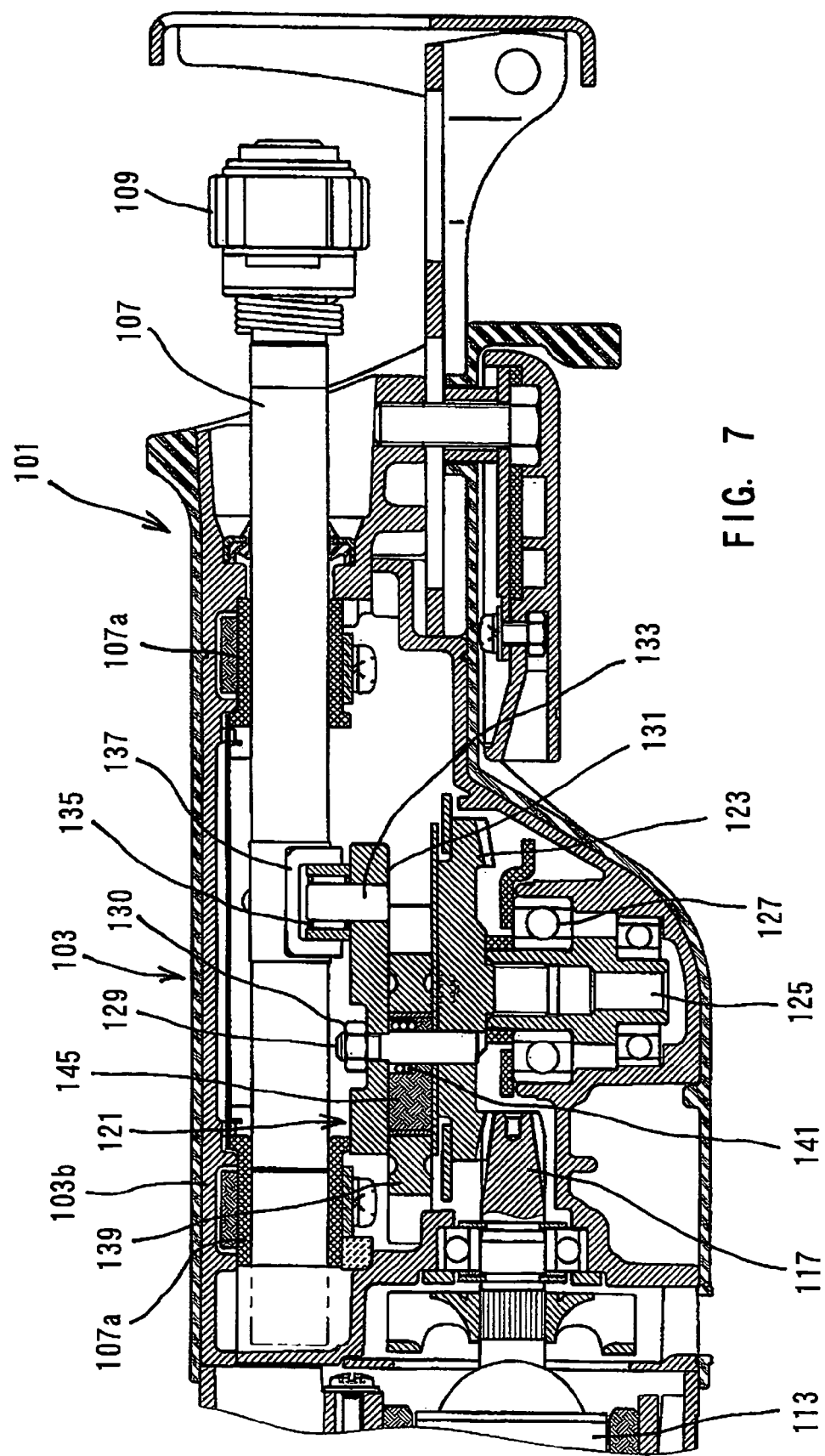
FIG. 7 is a partial, sectional view of an essential part of the representative reciprocating saw.

FIG. 7 is a sectional front view showing an essential part of the reciprocating saw 101 according to the second representative embodiment. In FIG. 7, the handgrip 103c and the blade are not shown. As shown in FIG. 7, bearings 107a support the slider 107 such that the slider 107 can reciprocate in its axial direction. The slider 107 is connected to a motor output shaft 117 via a motion converting mechanism 121 that is disposed within the gear housing 103b of the body 103. The motion converting mechanism 121 converts the rotational motion of the motor output shaft 117 into the reciprocating motion in the axial direction of the slider 107. The motion converting mechanism 121 comprises a bevel gear 123, an eccentric pin 129, a crank 131, a guide pin 133, a cam plate 145 and a counter weight 139. The cam plate 145 is a feature that corresponds to the "rotating element" in the present invention.

The bevel gear 123 is rotatably supported by bearings 127 and mounted on the upper end of a rotating shaft 125 such that the bevel gear 123 can rotate together with the rotating shaft 125. The bevel gear 123 engages with the motor output shaft 117. One end (lower end as viewed in FIG. 7) of the eccentric pin 129 is fixedly press-fitted into the bevel gear 123 at a position shifted a predetermined distance from the center of rotation of the bevel gear 123. The cam plate 145 and the crank 131 are fitted around the other end portion (upper end portion as viewed in the drawing) of the eccentric pin 129.

The crank 131 is fastened to the eccentric pin 129 by a nut 130 and thus integrated with the eccentric pin 129. When the bevel gear 123 rotates around the rotating shaft 125 in a direction shown by arrow Q in FIG. 8, the crank 131 revolves around the rotating shaft 125 together with the eccentric pin 129. As a result, a guide pin 133 that is mounted to the end portion of the crank 131 is allowed to move between the right position above the rotating shaft 125 as shown in FIG. 7 and the left position (not shown) above the rotating shaft 125.

Figure 8:
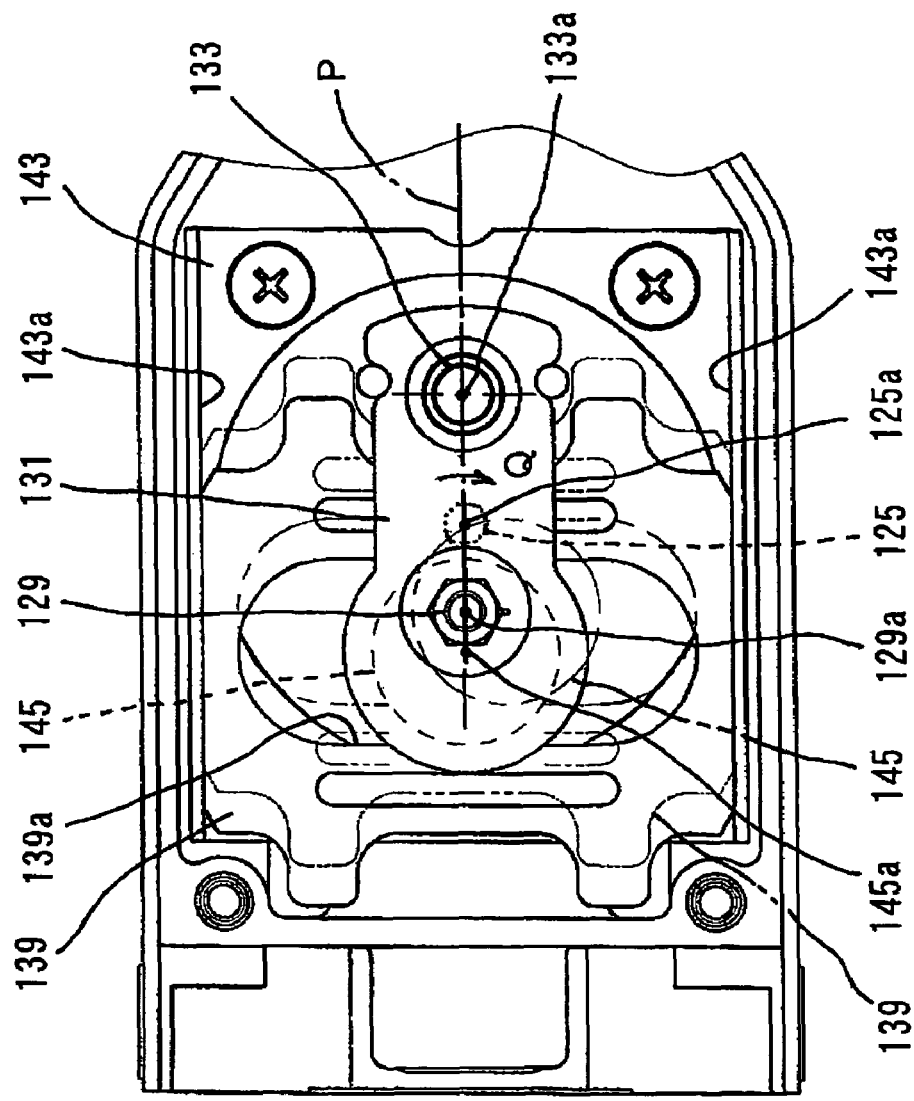
FIG. 8 is a plan view of a motion converting mechanism.

The guide pin 133 and the eccentric pin 129 are placed on opposite sides of the center of rotation (the rotating shaft 125) of the bevel gear 123, and the lower end of the guide pin 133 is fixedly press-fitted into the end portion of the crank 131. In other words, as shown in FIG. 8, the guide pin 133, the rotating shaft 125 and the eccentric pin 129 are arranged such that the respective centers 133a, 125a and 129a are positioned on a straight line P in a horizontal plane. The upper end of the guide pin 133 is fitted in a slider block 137 of the slider 107 via a bearing 135. The guide pin 133 can rotate with respect to the slider 107, while being prevented from displacing in its radial and axial direction with respect to the slider 107.

The cam plate 145 has a disc-like shape and is disposed between the bevel gear 123 and the crank 131. The cam plate 145 is fitted around the eccentric pin 129 at a position shifted a predetermined distance from the center of gravity 145a of the cam plate 145 and can eccentrically rotate around the eccentric pin 129. The counter weight 139 is loosely fitted around the cam plate 145. When the bevel gear 123 is rotated around the rotating shaft 125 via the motor output shaft 117, the cam plate 145 revolves around the rotating shaft 125 together with the eccentric pin 129. By this movement of the cam plate 145, the counter weight 139 can reciprocate in the axial direction of the slider 107. As shown in FIG. 8, an engagement slot 139a is formed in the counter weight 139. Of the revolving motion of the cam plate 145 around the rotating shaft 125, components of the motion in the direction crossing the longitudinal axis of the slider 107 within a horizontal plane escape into the engagement slot 139a and only components of the motion in the axial direction of the slider 107 are transmitted to the counter weight 139. The counter weight 139 is thus allowed to reciprocate only in the axial direction of the slider 107. As shown in FIG. 8, the counter weight 139 is slidably supported by a slide guide 143a of a retaining plate 143 that is mounted onto the body 103, so that a reliable reciprocating movement of the counter weight 139 is ensured.

The guide pin 133 that drives the slider 107 and the cam plate 145 that drives the counter weight 139 are placed on opposite sides of the center of rotation (the rotating shaft 125) of the bevel gear 123. With this configuration, the slider 107 and the counter weight 139 can reciprocate with a predetermined phase difference.

The cam plate 145 is loosely fitted around the eccentric pin 129 such that it can eccentrically rotate around the eccentric pin 129 at a position shifted a predetermined distance from the center of gravity 145a of the cam plate 145. Therefore, when the cam plate 145 eccentrically rotates a predetermined angle around the eccentric pin 129, the timing of the reciprocating movement of the counter weight 139 changes. The eccentric rotation of the cam plate 145 around the eccentric pin 129 is a feature that corresponds to the "rotation of the rotating element around the eccentric pin" in the invention.

Figure 9:
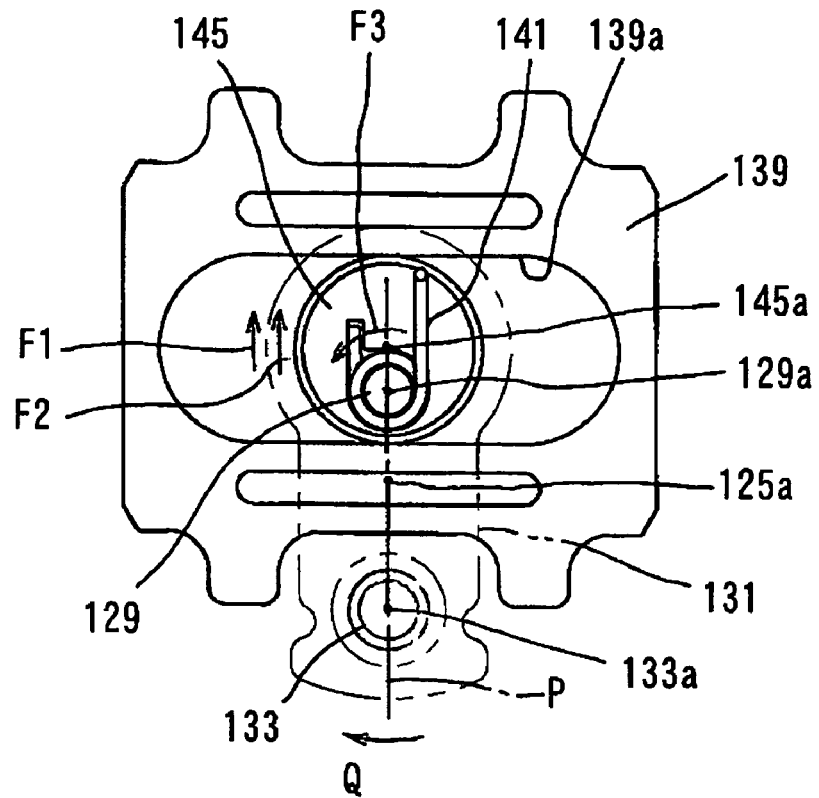
FIG. 9 shows the operation of a cam plate under unloaded conditions (in the first vibration reducing mode).
Figure 10:
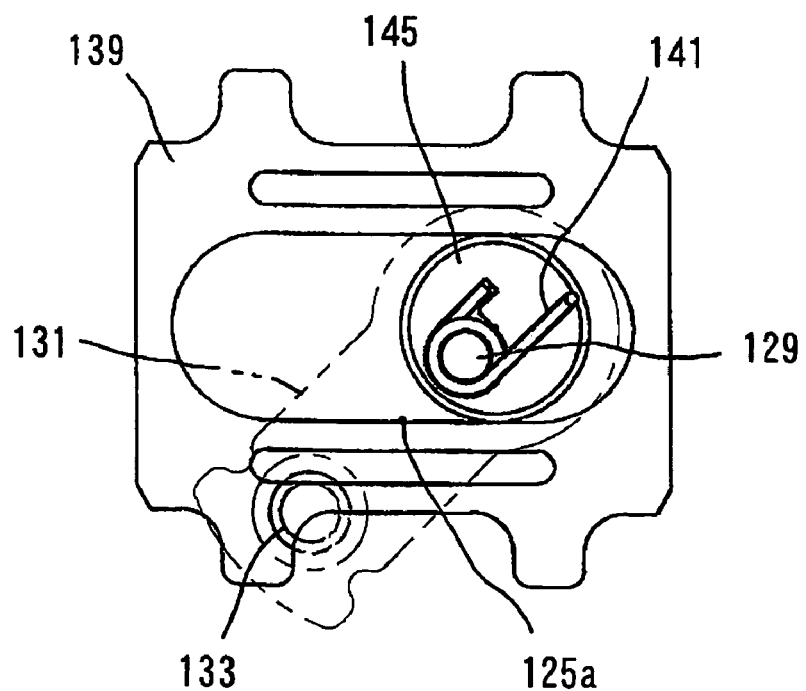
FIG. 10 shows the operation of the cam plate under unloaded conditions in the state in which it is rotated 45° clockwise from the state shown in FIG. 9.
Figure 11:
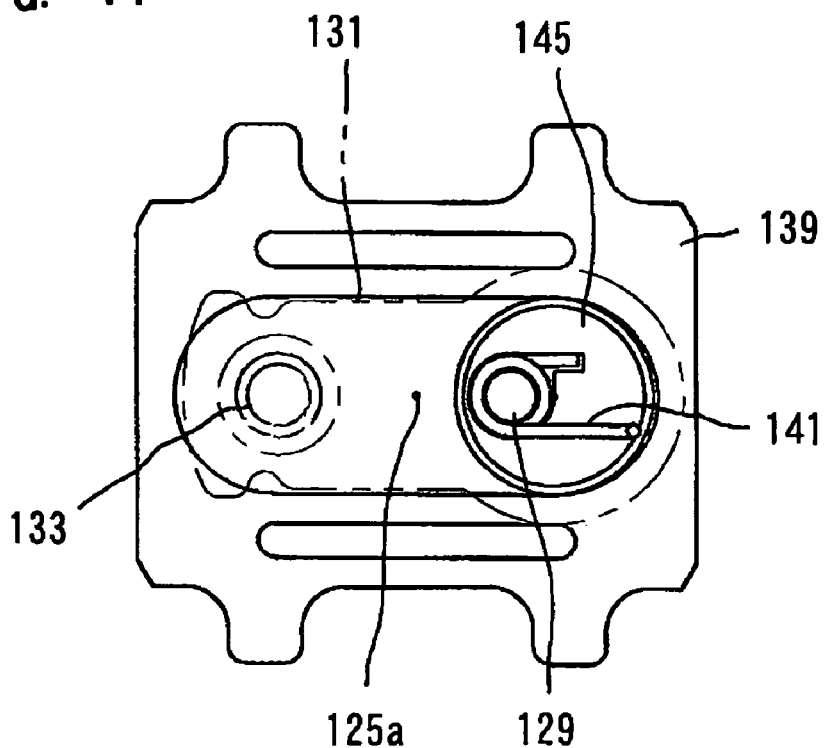
FIG. 11 shows the operation of the cam plate under unloaded conditions in the state in which it is rotated 45° clockwise from the state shown in FIG. 10.
Figure 12:
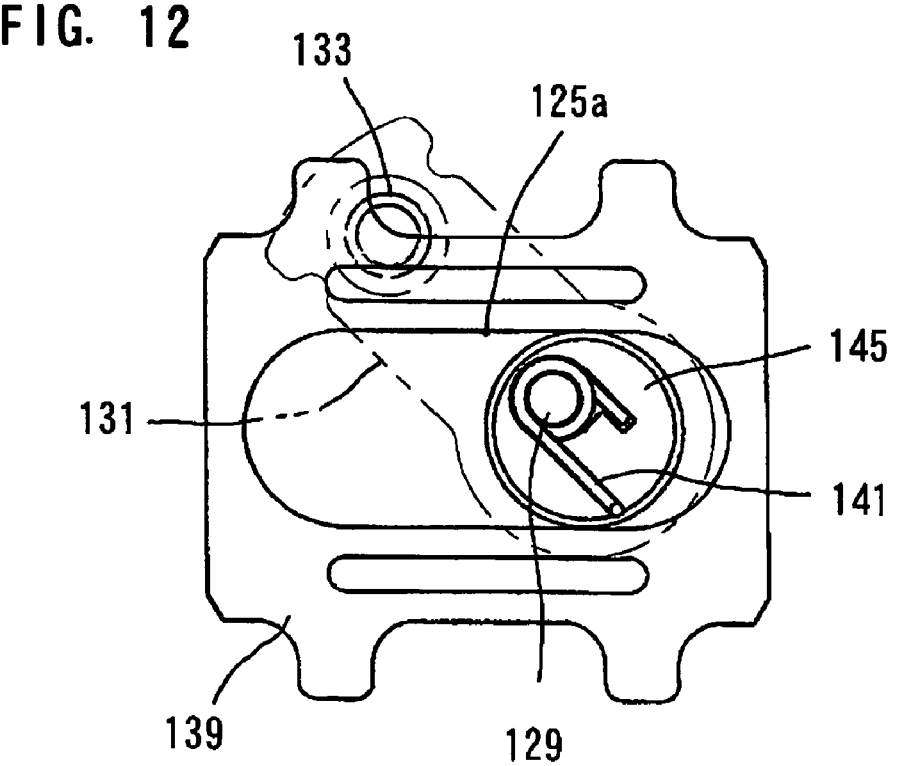
FIG. 12 shows the operation of the cam plate under unloaded conditions in the state in which it is rotated 45° clockwise from the state shown in FIG. 11.
Figure 13:
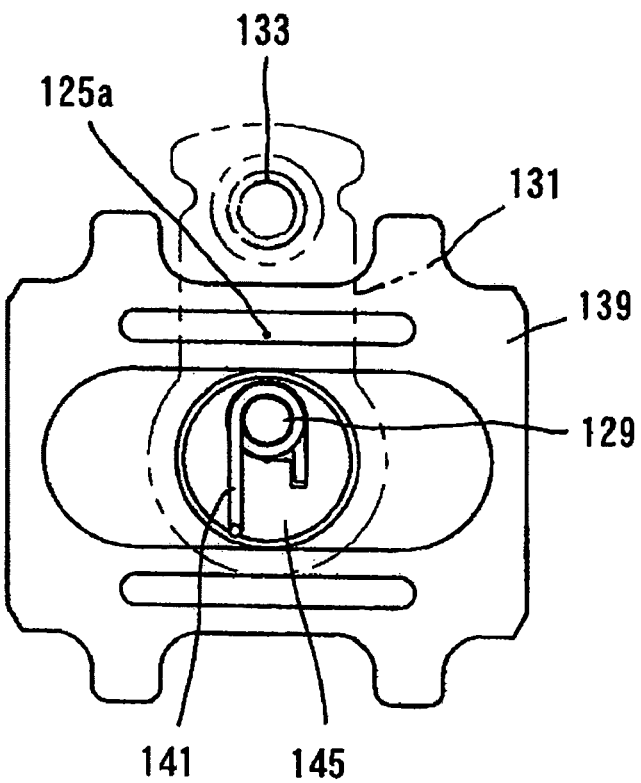
FIG. 13 shows the operation of the cam plate under unloaded conditions in the state in which it is rotated 45° clockwise from the state shown in FIG. 12.
Figure 14:
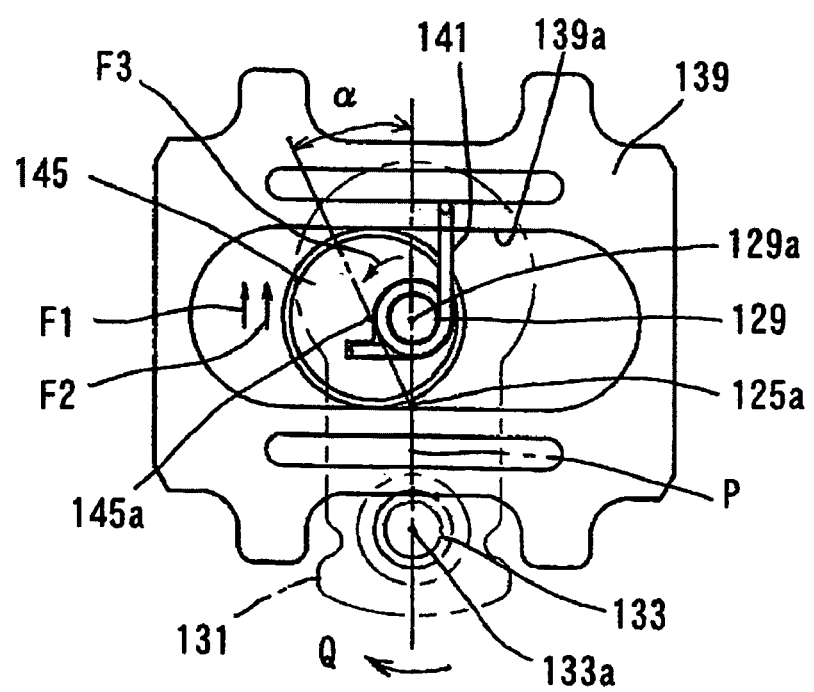
FIG. 14 shows the operation of the cam plate under loaded conditions (in the second vibration reducing mode).
Figure 15:
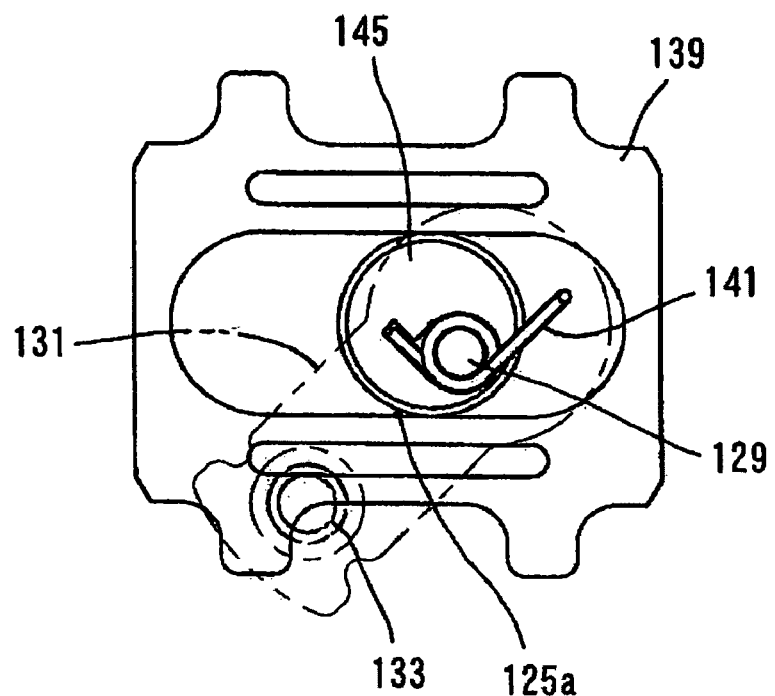
FIG. 15 shows the operation of the cam plate under loaded conditions in the state in which it is rotated 45° clockwise from the state shown in FIG. 14.
Figure 16:
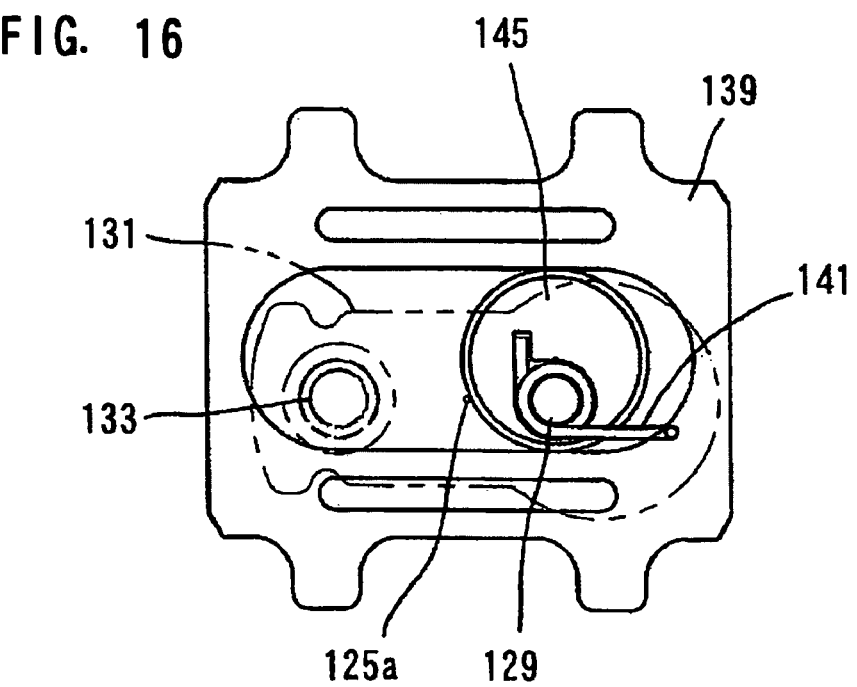
FIG. 16 shows the operation of the cam plate under loaded conditions in the state in which it is rotated 45° clockwise from the state shown in FIG. 15.
Figure 17:
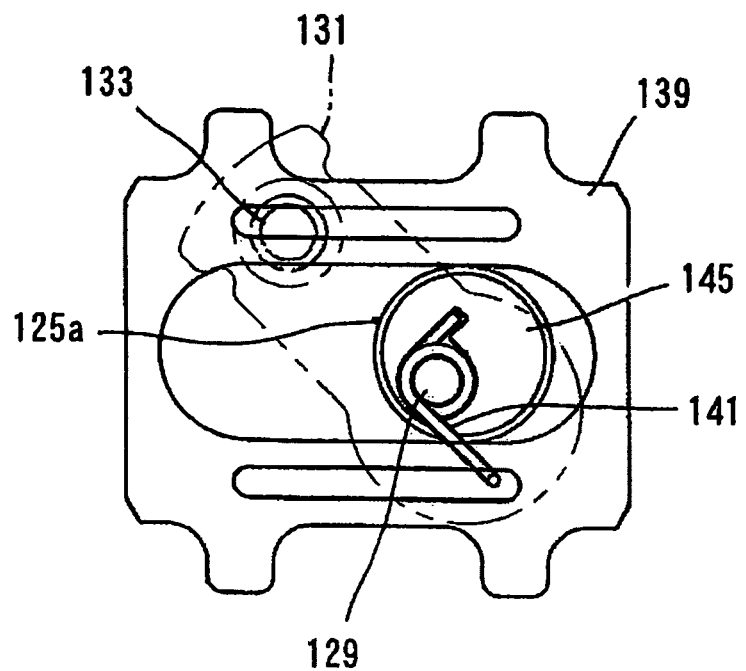
FIG. 17 shows the operation of the cam plate under loaded conditions in the state in which it is rotated 45° clockwise from the state shown in FIG. 16.
Figure 18:
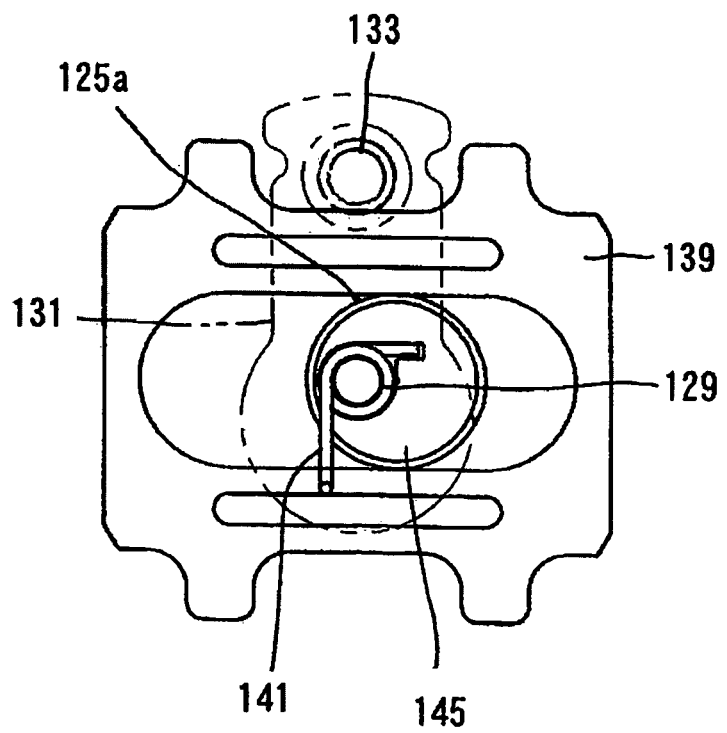
FIG. 18 shows the operation of the cam plate under loaded conditions in the state in which it is rotated 45° clockwise from the state shown in FIG. 17.

When the bevel gear 123 is rotated around the rotating shaft 125 via the motor output shaft 117, as shown in FIGS. 9 and 14, a rotating force (moment) F1 that is caused by centrifugal force of the cam plate 145 and a rotating force (moment) F2 that is caused by the inertial force of the counter weight 139 being inputted via the contact point between the counter weight and the cam plate, act on the cam plate 145 (which is supported by the eccentric pin 129 at a position shifted a predetermined distance from the center of gravity 145a) around the eccentric pin 129. Specifically, the resultant of the rotating force F1 caused by the centrifugal force and the rotating force F2 caused by the inertial force acts on the cam plate 145. A torsion spring 141 is provided to apply a biasing force (spring force) F3 against the resultant rotating force. The torsion spring 141 is a feature that corresponds to the "elastic member" in this invention.

The torsion spring 141 is disposed within a recess of the cam plate 145. One end of the torsion spring 141 is engaged with the crank 131 and the other end is engaged with the cam plate 145. In other words, the torsion spring 141 is disposed between the crank 131 and the cam plate 145 and applies a biasing force in a direction opposite to the above-mentioned resultant rotating force. When the motor 113 is driven, the cam plate 145 is held in a position in which the resultant rotating force and the spring force of the torsion spring 141 are balanced.

In this embodiment, under unloaded conditions in which the motor 113 is driven at a predetermined rotational speed and no load is applied to the blade, as shown in FIG. 9, the cam plate 145 eccentrically rotates around the eccentric pin 129 while compressing the torsion spring 141 by the resultant rotating force that acts on the cam plate 145. When the cam plate 145 eccentrically rotates into a position in which the center of gravity 145a of the cam plate 145 is remotest from the rotating shaft 125 on the above-mentioned line P, the resultant rotating force and the spring force of the torsion spring 141 are balanced. The center 125a of the rotating shaft 125, the center 129a of the eccentric pin 129, the center 133a of the guide pin 133 and the center of gravity 145a of the cam plate 145 are all located on the line P, and the crank 131 and the cam plate 145 are placed in alignment with each other with respect to the line P. In this state, the counter weight 139 reciprocates with a 180° phase shift in the opposite direction with respect to the slider 107. The position of the eccentrically rotating cam plate 145 in this state is a feature that corresponds to the "first position" in this invention (see a dotted line in FIG. 8).

Under loaded conditions in which a load is applied to the blade, as shown in FIG. 14, the rotational speed of the motor 113 decreases according to the load. When the rotational speed decreases, the resultant of the rotating force F1 by the centrifugal force and the rotating force F2 by the inertial force acting on the cam plate 145 also decreases. As a result, the cam plate 145 eccentrically rotates around the eccentric pin 129 by the spring force F3 of the torsion spring 141, and the spring force of the torsion spring 141 also decreases. Thus, the cam plate 145 eccentrically rotates into a position in which the resultant rotating force and the spring force of the torsion spring 141 are balanced. By this eccentric rotation, the phase of the reciprocating movement of the counter weight 139 is delayed by a predetermined angle □, compared with the 180° phase shifted state with respect to the phase of the reciprocating movement of the slider 107 under unloaded conditions. At this time, the center of gravity 145a of the cam plate 145 is moved off the line P and the cam plate 145 is displaced out of alignment with respect to the crank 131. As a result, the phase difference is created. The position of the eccentrically rotating cam plate 145 in this state is a feature that corresponds to the "second position" in this invention (see a phantom line in FIG. 8).

In the state in which the motor is stopped and the resultant rotating force is not acting on the cam plate 145, although it is not particularly shown, the cam plate 145 eccentrically rotates by the spring force of the torsion spring 141 in the same direction by a larger angle than under the above-mentioned loaded conditions. This position is defined as the initial position.

Operation and usage of the reciprocating saw 101 constructed as described above will now be explained. When the user depresses the trigger switch 115 on the handgrip 103c of the reciprocating saw 101, the motor 113 is driven by driving current supplied from the battery 105. Thus, the motor output shaft 117 as shown in FIG. 7 is rotated. When the motor output shaft 117 rotates, the bevel gear 123 that engages with the motor output shaft 117 rotates (clockwise as viewed in FIG. 8) around the rotating shaft 125 in a horizontal plane. Then, the eccentric pin 129 that is eccentrically disposed in a position displaced from the rotating shaft 125 revolves around the rotating shaft 125. As a result, the crank 131 revolves around the rotating shaft 125 in a horizontal plane together with the eccentric pin 129.

As the crank 131 revolves, the guide pin 133 also revolves around the rotating shaft 125 while rotating. The guide pin 133 is loosely fitted in the slider block 137 via the bearing 135. By the revolving movement of the guide pin 133, the slider 107 reciprocates in its axial direction. The rotating movement of the guide pin 133 is received by the bearing 135 and not transmitted to the slider 107. Thus, the blade (same with the blade 111 of the first representative embodiment in FIG. 1) that is coupled to the chuck 109 on the end of the slider 107 reciprocates in the axial direction of the slider 107 and cuts the workpiece.

In this embodiment, in the state in which the motor 113 is driven by depressing the trigger switch 115, but the reciprocating saw 101 is not performing an operation of cutting a workpiece, that is, in the state in which the reciprocating saw 101 is driven under no load, a cutting resistance is not applied to the blade, and thus the motor 113 is rotated at a predetermined high rotational speed. When the motor is rotated at this predetermined speed, as mentioned above, the resultant rotating force acting on the cam plate 145 increases to a maximum. The cam plate 145 eccentrically rotates (clockwise as viewed in FIG. 4) around the eccentric pin 129 while compressing the torsion spring 141. Then, the slider 107 and the counter weight 139 reciprocate with a 180° phase shift in opposite directions with respect to each other. At this time, the resultant rotating force and the spring force of the torsion spring 141 are balanced. Under unloaded conditions, the counter weight 139 reciprocates in this state (see FIGS. 9 to 13). This state is defined as a first vibration reducing mode.

In the first vibration reducing mode shown in FIGS. 9 to 13, the center of gravity 145a of the cam plate 145 is located on the line P connecting the respective centers 133a, 125a and 129a of the guide pin 133, the rotating shaft 125 and the eccentric pin 129, and the crank 131 and the cam plate 145 are placed in alignment with each other with respect to the line P. In this state, the phase of the reciprocating movement of the slider 107 and the phase of the reciprocating movement of the counter weight 139 are 180° out of phase with respect to each other. In other words, the slider 107 and the counter weight 139 reciprocate with a 180° phase shift in opposite directions with respect to each other. The axial momentum of the slider 107 in the first vibration reducing mode is determined by the inertial force that is caused by the slider 107, the chuck 109 and the blade reciprocating together in one piece. In the first vibration reducing mode, by the reciprocating movement of the slider 107 and the counter weight 139 with a 180° phase shift with respect to each other, the momentum and/or kinetic energy caused by the inertial force in the axial direction of the slider 107 is reduced by the momentum or kinetic energy caused by the movement of the counter weight 139 in the opposite direction. Thus, vibration of the reciprocating saw 101 can be effectively reduced.

Figure 19:
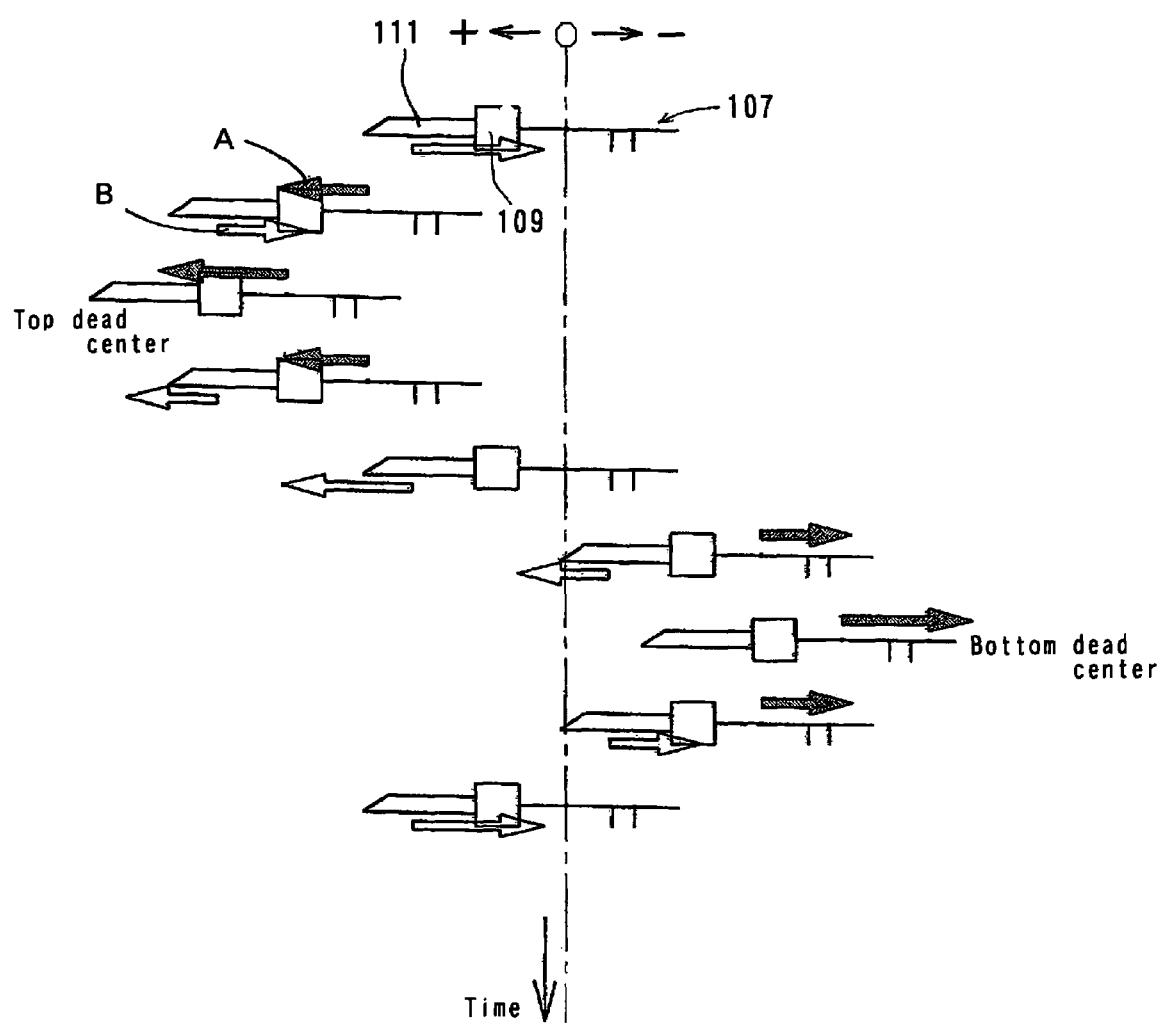
FIG. 19 schematically shows the relationship between the inertial force and the cutting resistance acting on a blade that reciprocates together with a slider.

On the other hand, in the state of in which the motor 113 is driven by depressing the trigger switch and the reciprocating saw 101 is performing an operation of cutting a workpiece, that is, under loaded driving conditions for cutting a workpiece, it is necessary to consider not only the inertial force caused by the slider 107, the chuck 109 and the blade reciprocating together in one piece, but the cutting resistance caused between the workpiece and the blade. This is because the timing for vibration reduction by the counter weight 139 may be shifted due to such cutting resistance received from the workpiece. FIG. 19 shows the relationship between the inertial force and the cutting resistance under loaded driving conditions of the reciprocating saw 101 according to this embodiment. In FIG. 19, the inertial force that is caused by the slider 107, the chuck 109 and the blade reciprocating together in one piece is shown by solid arrow A, and the cutting resistance that the blade receives from the workpiece during cutting operation is shown by hollow arrow B.

As seen from FIG. 19, the inertial force A acts in the advancing direction of the slider 107, the chuck 109 and the blade, while the cutting resistance B acts in the direction opposite to this advancing direction. Further, the inertial force A is determined by the acceleration of the slider 107, the chuck 109 and the blade, while the cutting resistance B is determined by the speed of these elements. There is a phase difference of 90° between the inertial force and the cutting resistance. Thus, the force (cutting resistance) having a different phase is applied, as a function in which the speed is a variable, to the inertial force A that is caused by the slider 107, the chuck 109 and the blade. Therefore, in order to effectively reduce vibration in the reciprocating saw 101 under loaded driving conditions, not only the inertial force A but the cutting resistance B to be received from the workpiece must be taken into account.

In this embodiment, in order to achieve vibration reduction with consideration given to the cutting resistance B as well as the inertial force A, the axial position of the counter weight 139 is appropriately changed by eccentrically rotating the cam plate 145, so that the phase difference between the reciprocating movement of the slider 107 and the reciprocating movement of the counter weight 139 is changed.

For example, when a predetermined cutting resistance is applied from a workpiece to the blade during cutting operation, the rotational speed of the motor 113 and thus, the rotational speed of the bevel gear 123 decrease according to the cutting resistance. At this time, the speed of revolution of the cam plate 145 which is caused by rotation of the bevel gear 123 also decreases. Accordingly, the centrifugal force acting on the cam plate 145 and the inertial force acting on the counter weight 139 also decrease. Therefore, the resultant rotating force around the eccentric pin 129 of the centrifugal force acting on the cam plate 145 and the inertial force decreases. As a result, as shown in FIG. 14, the cam plate 145 eccentrically rotates (counterclockwise as viewed in FIG. 14) by the biasing force (restoring force) of the torsion spring 141. At this time, the center of gravity 145a of the cam plate 145 is moved off the line P. In this state, the cam plate 145 revolves around the rotating shaft 125 and causes the counter weight 139 to reciprocate (see FIGS. 14 to 18). This state is defined as a second vibration reducing mode.

In FIGS. 14 to 18, the crank 131 is rotated clockwise around the rotating shaft 125. Thus, the cam plate 145 is rotated a predetermined angle around the eccentric pin 129 with respect to the crank 131 in a direction opposite to the rotating direction of the crank 131. As a result, compared with the first vibration reducing mode (see FIG. 8), in which the crank 131 and the cam plate 145 are placed in alignment with each other with respect to the line P, in the second vibration reducing mode, the phase of the reciprocating movement of the counter weight 139 is delayed with respect to the phase of the reciprocating movement of the slider 107. In other words, in the second vibration reducing mode, by eccentrically rotating the cam plate 145 around the eccentric pin 129, the phase difference between the reciprocating movement of the counter weight 139 and the reciprocating movement of the slider 107 is widened with the phase delay of the counter weight 139, compared with the first vibration reducing mode.

In the second vibration reducing mode, compared with the first vibration reducing mode, the phase difference between the reciprocating movement of the counter weight 139 and the reciprocating movement of the slider 107 is changed with the phase delay of the counter weight 139. Such a phase delay is in response to the cutting resistance that the blade receives from the workpiece. Specifically, in the second vibration reducing mode, the timing for vibration reduction by the counter weight 139 can be optimized by delaying the phase of the reciprocating movement of the counter weight 139 by the appropriate amount in response to the cutting resistance that the blade receives from the workpiece.

The angle of rotation of the cam plate 145 around the eccentric pin 129, or, the phase delay of the counter weight 139 with respect to the slider 107 is adjusted by appropriately deforming (restoring) the torsion spring 141 according to the cutting resistance that the blade receives. Thus, stepless switching between the first vibration reducing mode shown in FIG. 8 and the second vibration reducing mode shown in FIG. 14 can be performed. Therefore, even in the case in which the cutting resistance from the workpiece varies according to various parameters, such as the speed of the reciprocating movement of the blade and the magnitude of the pressing force of the user upon the blade, the optimum timing for vibration reduction can be provided each time. Further, when the reciprocating saw 101 is idled after completion of the cutting operation, cutting resistance is not applied to the blade, and thus the rotational speeds of the motor 113 and the bevel gear 123 are restored to the initial speeds in the unloaded conditions. Then, the rotating forces by the centrifugal force acting on the cam plate 145 and the inertial force acting on the counter weight 139 increase. As a result, the cam plate 145 eccentrically rotates around the eccentric pin 129 while deforming the torsion spring 141. The cam plate 145 then automatically returns to the position (the first vibration reducing mode) in which it is placed in alignment with the crank 131 with respect to the line P with the center of gravity 145a being located on the line P.

According to this embodiment, the eccentric rotation of the cam plate 145 around the eccentric pin 129 is caused by the cutting resistance that the blade receives from the workpiece. In the state in which the blade does not receive cutting resistance from the workpiece, the cam plate 145 is placed in alignment with the crank 131 with respect to the line P, or, the center of gravity 145a is placed on the line P, by the balance between the torsion spring 141 and the resultant rotating force.

On the other hand, during the cutting operation of the workpiece, in which the blade receives cutting resistance from the workpiece, the cam plate 145 eccentrically rotates around the eccentric pin 129 by the restoring force of the torsion spring 141 according to the magnitude of the cutting resistance. The rotation angle of the cam plate 145 can be changed according to the magnitude of the cutting resistance. Thus, the phase of the reciprocating movement of the counter weight 139 is delayed from the 180° phase shifted state with respect to the phase of the reciprocating movement of the slider 107. As a result, the phase difference between the reciprocating movement of the slider 107 and the reciprocating movement of the counter weight 139 is adjusted such that timing for vibration reduction is provided taking into account the cutting resistance that the blade receives from the workpiece, as well as the inertial force that is caused by the reciprocating movement of the slider 107, the chuck 109 and the blade.

When the blade receives higher cutting resistance from the workpiece than in the second vibration reducing mode shown in FIGS. 14 to 18, the rotational speed further decreases according to the cutting resistance, and the cam plate 145 is further displaced from the state shown in FIGS. 14 to 18 with respect to the crank 131 by the restoring force of the torsion spring 141. Specifically, when higher cutting resistance is generated, the phase of the reciprocating movement of the counter weight 139 is adjusted to be further delayed according to such increase of the cutting resistance. Thus, the optimum timing for vibration reduction by the counter weight 139 can be maintained.

According to this embodiment, the timing for reduction of the momentum by the counter weight 139 can be optimized according to the magnitude of the cutting resistance. Thus, the timing for vibration reduction under unloaded and loaded driving conditions of the reciprocating saw 101 and vibration reduction according to the magnitude of the cutting resistance can be optimized.

In this embodiment, the timing for vibration reduction is optimized by delaying the phase of the reciprocating movement of the counter weight 139 with respect to the phase of the reciprocating movement of the slider 107. However, it may also be suitably constructed such that the phase of the reciprocating movement of the slider 107 is advanced from the 180° phase shifted state with respect to the phase of the counter weight 139 in order to provide timing for vibration reduction.

Further, although, in this embodiment, the reciprocating saw 101 is described as an representative example of a reciprocating power tool, this invention may be widely applied to any tool, such as a jig saw, which performs an operation on a workpiece while reciprocating.

DESCRIPTION OF THE NUMERALS 101 reciprocating saw
103 body
105 battery
107 slider
109 chuck
111 blade (tool bit)
113 motor
115 trigger switch
117 motor output shaft
121 motion converting mechanism
123 bevel gear
125 rotating shaft
125a center
127 bearing
129 eccentric pin
129a center
131 crank
131a base
131b slider driving part
132 counter weight driving part
133 guide pin
133a center
135 bearing
137 slider block
139 counter weight
141 torsion spring (elastic member)
143 retaining plate
143a slide guide
145 cam plate
145a center of gravity

We claim:

1. A reciprocating power tool comprising:
  a motor,
  a tool bit that performs a predetermined operation by reciprocating,
  a slider that reciprocates to drive the tool bit,
  a motion converting mechanism including a crank mechanism that converts a rotating output of die motor into a reciprocating movement of the slider,
  a counter weight provided in the motion converting mechanism, the counter weight reciprocating in a direction opposite to the reciprocating direction of the slider, wherein the phase difference between the reciprocating movement of the slider and the reciprocating movement of the counter weight is set such that a time lag is provided between the instant when the slider reaches a top dead center and the instant when the counter weight reaches a bottom dead center, and
  a bevel gear provided in the motion converting mechanism, the bevel gear rotating about an axis perpendicular to a first plane, the counterweight reciprocating in a second plane substantially parallel to the first plane.

2. The reciprocating power tool as defined in claim 1, wherein the phase difference between the reciprocating movement of the slider and the reciprocating movement of the counter weight is fixedly set.

3. The reciprocating power tool as defined in claim 1, wherein the phase difference between the reciprocating movement of the slider and the reciprocating movement of the counter weight is fixedly set such that the phase of the reciprocating movement of the counter weight is delayed over 180° with respect to the phase of the reciprocating movement of the slider.

4. The reciprocating power tool as defined in claim 1, wherein the phase difference between the reciprocating movement of the slider and the reciprocating movement of the counter weight is provided to be switched from a state in which it is fixedly set to a predetermined phase difference to a state in which it is fixedly set to a different phase difference.

5. The reciprocating power tool as defined in claim 1, wherein the motion converting mechanism includes a first motion converting mechanism that rotates and converts the rotational movement of the motor into the reciprocating movement of the slider, and a second motion converting mechanism that rotates and converts the rotational movement of the motor into the reciprocating movement of the counter weight, and wherein the phase of the rotational movement of the second motion converting mechanism is fixed in a state in which it is delayed over 180° with respect to the phase of the rotational movement of the first motion converting mechanism.

6. The reciprocating power tool as defined in claim 5, wherein a positional relation between the first and the second motion converting mechanisms is provided to be switched from a state in which the first and second motion converting mechanisms are fixedly held in a predetermined positional relation to a state in which they are fixedly held in a different positional relation.

7. The reciprocating power tool as defined in claim 1, wherein the power tool is switched at least between a first vibration reducing mode in which the slider and the counter weight reciprocate to each other with a predetermined phase difference and a second vibration reducing mode in which the slider and the counter weight reciprocate to each other with a different phase difference from that in the first vibration reducing mode.

8. The reciprocating power tool as defined in claim 1, wherein the power tool is switched at least between a first vibration reducing mode in which the slider and the counter weight reciprocate to each ether with a predetermined phase difference and a second vibration reducing mode in which the slider and the counter weight reciprocate to each other with a different phase difference from that in the first vibration reducing mode, and wherein in the first vibration reducing mode, the slider and the counter weight reciprocate with a 180° phase shift in opposite directions with respect to each other.

9. The reciprocating power tool as defined in claim 1, wherein the power tool is switched at least between a first vibration reducing mode in which the slider and the counter weight reciprocate to each other with a predetermined phase difference and a second vibration reducing mode in which the slider and the counter weight reciprocate to each other with a different phase difference from that in the first vibration reducing mode, and wherein the slider and the counter weight are switched between the first vibration reducing mode and the second vibration reducing mode according to an external force acting on the tool bit from the outside.

10. The reciprocating power tool as defined in claim 9, wherein the power tool is provided as a reciprocating saw in which the tool bit is defined by a saw reciprocating in its longitudinal direction and the external force is defined by a cutting resistance when the saw reciprocatingly cuts a work.

11. The reciprocating power tool as defined in claim 1, wherein the power tool is switched at least between a first vibration reducing mode in which the slider and the counter weight reciprocate to each other with a predetermined phase difference and a second vibration reducing mode in which the slider and the counter weight reciprocate to each other with a different phase difference from that in the first vibration reducing mode, and wherein an elastic member is disposed in the motion convening mechanism, the elastic member deforming according to an external force acting on the tool bit from the outside to change the timing of outputting the reciprocating movement of the counter weight with respect to the inputting of the rotational movement of the motor, whereby the switching between the first vibration reducing mode and the second vibration reducing mode is performed.

12. The reciprocating power tool as defined in claim 1 in which the motion converting mechanism including an elastic member, an eccentric pin eccentrically disposed around a rotating shaft and a rotating element that rotates together with the eccentric pin to convert the rotational movement of the motor into the reciprocating movement of the counter weight,
wherein the rotating element is rotatably fitted around the eccentric pin such that it can be placed at least in two different positions to change the timing of the reciprocating movement of the counter weight with respect to the reciprocating movement of the slider,
the rotation of the rotating element around the eccentric pin is performed by balance between a resultant of a rotating force caused by the centrifugal force acting on the rotating element and a rotating force caused by the inertial force of the counter weight, and a biasing force applied by the elastic member in a direction opposite to the resultant rotating force, and
under unloaded conditions in which no external force is applied to the tool bit, the rotating element is placed in a first position in which the counter weight reciprocates with a 180° phase shift in the opposite direction with respect to the slider, while, under loaded conditions in which an external force is applied to the tool bit, the rotating element is placed in a second position in which the reciprocating movement of the counter weight with respect to the slider is delayed compared with the 180° phase shifted state under unloaded conditions.

13. The reciprocating power tool as defined in claim 12, wherein the elastic member is defined by a torsion spring provided between the eccentric pin and the rotating element.

14. The reciprocating power tool as defined in claim 13, wherein the torsion spring is disposed in a recess of the rotating element.

15. The reciprocating power tool as defined in claim 1, wherein the counter weight is disposed between the crank mechanism and the bevel gear.

16. A reciprocating power tool comprising:
a motor,
a tool bit that performs a predetermined operation by reciprocating,
a slider that reciprocates to drive the tool bit,
a motion converting mechanism that converts a rotating output of the motor into a reciprocating movement of the slider,
a counter weight provided in the motion converting mechanism, the counter weight reciprocating in a direction opposite to the reciprocating direction of the slider, and
a bevel gear provided in the motion converting mechanism, the bevel gear rotating about an axis perpendicular to a first plane, the counterweight reciprocating in a second plane substantially parallel to the first plane,
wherein the power tool can be switched at least between a first vibration reducing mode in which the slider and the counter weight reciprocate to each other with a predetermined phase difference and a second vibration reducing mode in which the slider and the counter weight reciprocate to each other with a different phase difference from that in the first vibration reducing mode.

17. The reciprocating power tool as defined in claim 16, wherein in the first vibration reducing mode, the slider and the counter weight reciprocate with a 180° phase shift in opposite directions to each other.

18. The reciprocating power tool as defined in claim 16, wherein the slider and the counter weight can be switched between the first vibration reducing mode and the second vibration reducing mode according to an external force acting on the tool bit from the outside.

19. The reciprocating power tool as defined in claim 16, wherein the power tool is provided as a reciprocating saw in which the tool bit is defined by a saw reciprocating in its longitudinal direction and the external force is defined by a cutting resistance when the saw reciprocatingly cuts a work.

20. The reciprocating power tool as defined in claim 16, wherein an elastic member is disposed in the motion converting mechanism, and the elastic member deforms according to an external force acting on the tool bit from the outside and thus changes the timing of outputting the reciprocating movement of the counter weight with respect to the inputting of the rotational movement of the motor, whereby the switching between the first vibration reducing mode and the second vibration reducing mode is performed.

21. The reciprocating power tool as defined in claim 16, wherein the motion converting mechanism includes an elastic member, an eccentric pin eccentrically disposed around a rotating shaft and a rotating element that rotates together with the eccentric pin to convert the rotational movement of the motor into the reciprocating movement of the counter weight, wherein the rotating element is rotatably fitted around the eccentric pin such that it can be placed at least in two different positions in order to change the timing of the reciprocating movement of the counter weight with respect to the reciprocating movement of the slider, the rotation of the rotating element around the eccentric pin is performed by balance between a resultant of a rotating force caused by the centrifugal force acting on the rotating element and a rotating force caused by the inertial force of the counter weight, and a biasing force that is applied by the elastic member in a direction opposite to the resultant rotating force, and under unloaded conditions in which no external force is applied to the tool bit, the rotating element is placed in a first position in which the counter weight reciprocates with a 180° phase shift in the opposite direction with respect to the slider, while, under loaded conditions in which an external force is applied to the tool bit, the rotating element is placed in a second position in which the reciprocating movement of the counter weight with respect to the slider is delayed compared with the 180° phase shifted state under unloaded conditions.

22. The reciprocating power tool as defined in claim 21, wherein the elastic member is defined by a torsion spring provided between the eccentric pin and the rotating element.

23. The reciprocating power tool as defined in claim 22, wherein the torsion spring is disposed in a recess of the rotating element.

* * * * *